United States Patent [19]
Theisen

[11] Patent Number: 5,887,634
[45] Date of Patent: Mar. 30, 1999

[54] TRACTOR MOUNTED STUMP GRINDER AND METHODS OF CONSTRUCTING AND OPERATING IT

[75] Inventor: David J. Theisen, Weidman, Mich.

[73] Assignee: Morbark, Inc., Winn, Mich.

[21] Appl. No.: 960,047

[22] Filed: Oct. 29, 1997

[51] Int. Cl.[6] .................................................. A01G 23/06
[52] U.S. Cl. ...................... 144/334; 144/24.12; 144/218; 144/235; 144/241; 56/15.3; 56/15.7; 37/302; 241/101.74; 241/277
[58] Field of Search ............................... 241/101.74, 277; 37/302; 144/24.12, 218, 231, 236, 241, 334, 235; 56/15.3, 15.7

[56] References Cited

U.S. PATENT DOCUMENTS

| | | | |
|---|---|---|---|
| 2,887,134 | 5/1959 | Bartlett | 144/24.12 |
| 3,028,691 | 4/1962 | Jeffres . | |
| 3,044,509 | 7/1962 | Kehler | 144/24.12 |
| 3,389,726 | 6/1968 | Good . | |
| 3,760,515 | 9/1973 | Morgan . | |
| 3,815,266 | 6/1974 | Schmitz et al. . | |
| 3,911,979 | 10/1975 | Rousseau | 144/24.12 |
| 4,402,352 | 9/1983 | Hodges . | |
| 4,681,145 | 7/1987 | York . | |
| 4,690,183 | 9/1987 | Eilertson . | |
| 4,783,914 | 11/1988 | Bowling . | |
| 4,960,157 | 10/1990 | Sheets . | |
| 4,998,573 | 3/1991 | York . | |
| 5,054,703 | 10/1991 | Morey . | |
| 5,237,803 | 8/1993 | Dominque, Jr. . | |
| 5,360,041 | 11/1994 | Stevens . | |
| 5,435,359 | 7/1995 | Craft | 144/24.12 |

*Primary Examiner*—W. Donald Bray
*Attorney, Agent, or Firm*—Reising, Ethington, Learman & McCulloch, PLLC

[57] ABSTRACT

A tractor driven stump grinder for a wheeled tractor frame having a drive motor operating the wheels to move the tractor forwardly and rearwardly, the tractor having a support member movable vertically on the tractor frame and rotatably carrying a generally vertically disposed broadsidely oriented grinder disc. A series of circumferentially spaced generally radial stump grinding tools project peripherally from each vertical face of the grinder disc, and a drive mechanism is provided for rotating the grinder disc in a plane transverse to the longitudinal tractor frame as it cuts a horizontal swath and then a subjacent swath in a pass across the upper end of a stump in both forward and rearward directions of movement of the tractor.

18 Claims, 3 Drawing Sheets

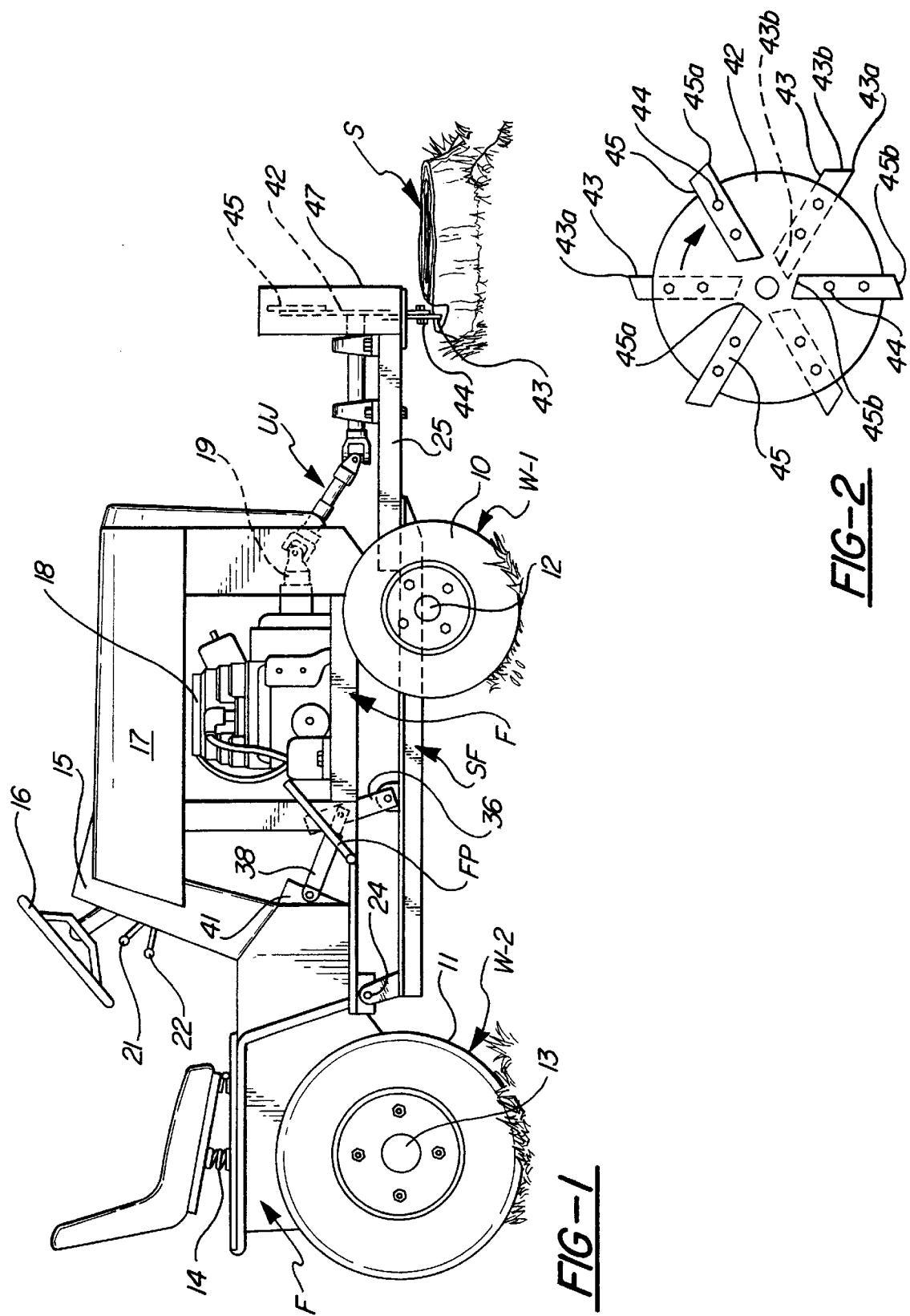

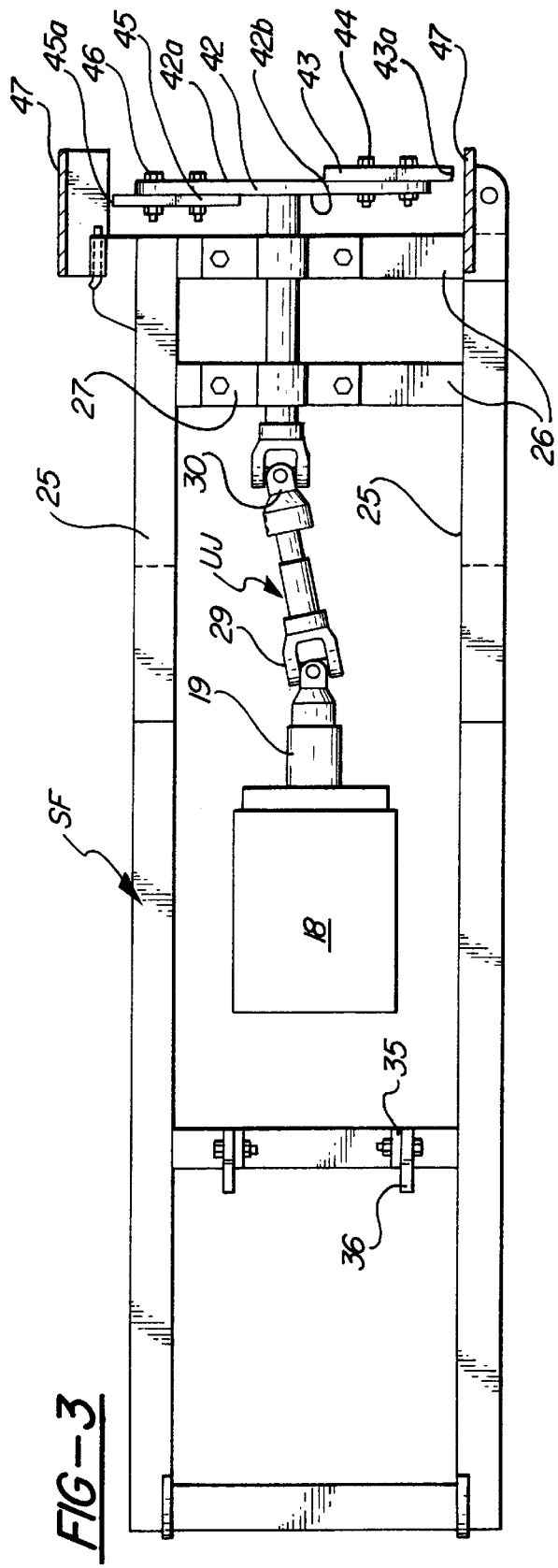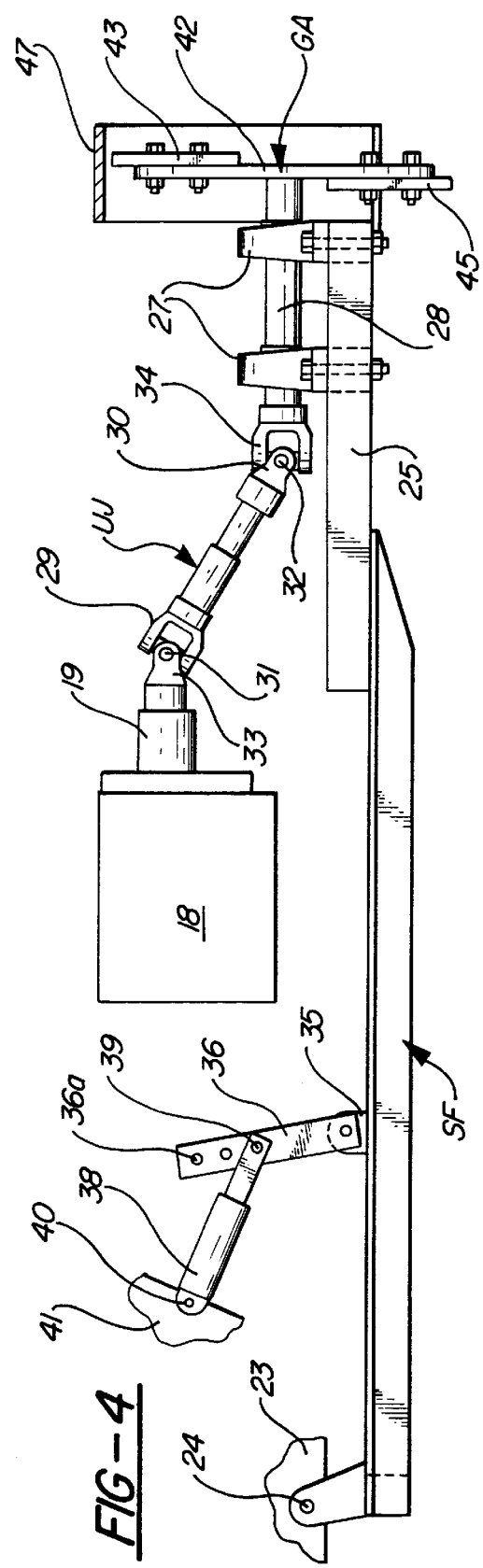

5,887,634

TRACTOR MOUNTED STUMP GRINDER AND METHODS OF CONSTRUCTING AND OPERATING IT

The present invention relates generally to stump grinders for disintegrating the stumps which remain when trees are cut with present day tree cutting machinery. More particularly, the invention relates to a self-propelled tractor wherein the motor for driving the tractor is used in conjunction with a grinding disc assembly disposed to rotate in a plane broadside to the length of the tractor.

BACKGROUND Of THE INVENTION

Varied types of stump cutting machines have been proposed in recent years for the purpose of removing or disintegrating stumps, and one of these is disclosed in U.S. Pat. No. 4,402,352, directed to a one man stump cutter in which the revolveable cutter wheel is progressively lowered in a vertical cutting path to the stump. In this patent, the wheel is longitudinally coextensive with the frame and mounted to rotate about an axis which is transverse to the frame.

In U.S. Pat. No. 4,681,145, a cutter disc is provided which is mounted on a hydraulically driven drive slide and moves along the length of the drive shaft while maintaining driving engagement therewith. Milling cutters are provided on one face of the disc. The foregoing patents, which I incorporate herein by reference, are typical of the many concepts which have been utilized in equipment already patented.

SUMMARY OF THE INVENTION

The present invention preferably utilizes a conventional self-propelled garden tractor of the type utilized for varied purposes. It is outfitted with a novel stump grinding attachment of a character to be described. Preferably, the tractor is supported on ground engaging front and rear tractor wheels and driven forwardly and rearwardly by a conventional gasoline engine which is connected to rotate the rear wheels either in the forwarding or rearwarding direction.

In accordance with the inventive concept, the subframe, mounted for vertical movement on the tractor frame, rotatably carries a generally vertically disposed grinder disc assembly which incorporates a disc extending broadside to the longitudinal extent of the tractor frame. The disc has a series of circumferentially spaced, generally radial tool bars projecting peripherally from each vertical face of the grinder disc. A drive member connects the subframe and tractor frame for the purpose of moving the disc assembly upwardly and downwardly on the tractor frame. A motor takeoff connected universally to the grinder disc drives the grinder disc in rotation to cut a horizontal swath in a pass across the upper end of the stump in both forward and return directions of movement of the tractor following successive lowering movement of the subframe and disc assembly after each pass has occurred.

When the disc assembly is moving forwardly, it rotates in one direction of rotation and, when it is moving rearwardly in another grinding pass, it continues to rotate in the same direction of rotation.

One of the prime objects of the present invention is to provide a very effective and economical stump grinder which may be easily operated by one person to rapidly reduce the stump to be removed.

Another object of the invention is to provide a stump grinder in which the operator remains seated and need not exert any physical force to operate the machine other than the minimal force required to move controls.

Still another object of the invention is to provide a stump grinder which is easily maneuvered by the operator and is versatile in the sense it can be employed to disintegrate stumps which are wider than the cutting disc assembly.

Still another object of the invention is to provide a stump grinding machine which maximizes operator safety in the sense that the operator is positioned far in the rear of the stump reducing operation and effectively guarded.

A further object of the invention is to design a reliable stump grinding assembly and an effective and economical method of constructing and operating it.

Still a further of the invention is to design a system of the character described which is durable and relatively maintenance free.

THE DRAWINGS

The presently preferred embodiment of the invention is disclosed in the following description and in the accompanying drawings, wherein:

FIG. 1 is a side elevational view of the tractor with the grinder disc assembly illustrated in position adjacent a stump to be disintegrated;

FIG. 2 is an end elevational view of the grinder disc only;

FIG. 3 is a fragmentary, schematic top plan view showing only the tractor subframe with the unique grinding disc assembly mounted thereon;

FIG. 4 is a similar schematic, fragmentary side elevational view;

GENERAL DESCRIPTION

Figure 5:
FIG. 5 is a broadside elevational view of the grinder-disc assembly illustrating the manner in which it grinds the disc.
Figure 6:
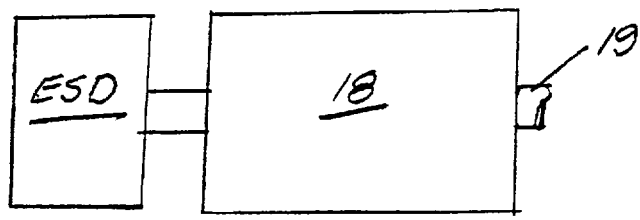
FIG. 6 is a schematic diagram illustrating the drive transmission elements which are employed.

Referring now more particularly to the accompanying drawings, and in the first instance to FIG. 1, a typical conventional tractor such as a heavy duty garden tractor is shown and comprises a frame, generally designated F, supported on the inflated front tires 10 and rear tires 11 of front and rear pairs of wheels, generally designated W-1 and W-2, mounted respectively on frame supported axles 12 and 13. The frame F, in the usual manner, mounts a seat on springs 14, opposite a frame integrated control console 15, which journals a steering wheel 16 connected through suitable steering linkage to the front wheels W-1 in the conventional manner.

Frame F further includes a motor housing, generally designated 17, for a conventional gasoline motor 18 which provides the power for driving the wheels W-1 and W-2 forwardly and rearwardly. Typically, it is the rear wheels which are hydrostatically driven in selected forward and rearward movement through suitable conventional drive transmission elements ESP (FIG. 5), which may include a hydraulic pump, hydraulic control valve system, and a hydraulic motor for driving the wheels.

A power takeoff 19 projecting from a gear box 20 is also provided in the usual manner. A control lever 21, provided on the control console, typically controls the direction of rotation of the wheels W-1, W-2 and a control lever 22 typically controls the pivot of a subframe, generally designated SF. A foot pedal accelerator FP, to control the speed the motor drive, is also provided.

As FIGS. 3 and 4 particularly indicate, the vertically adjustable subframe or support member, generally designated SF, is hung on frame-mounted brackets 23 and pivots vertically thereon about pivots 24. It is to be understood that the tractor, as thus far described, is conventional and that, typically, the takeoff 19 will drive a snowblower or another implement in rotation.

To facilitate supporting the grinding disc assembly, generally designated GA, the subframe SF mounts a pair of forwardly extending support arms 25 integrated by spanning front braces 25a which provide a support platform for longitudinally spaced apart bearings 27 which journal a drive shaft 28.

The grinding disc assembly GA, which will presently be described in detail, fixes to the front end of the drive shaft 28 and is driven in rotation by the shaft 28 via a universal joint connector, generally designated UJ. Joint UJ includes clevis ends 29 and 30 pivoted at 31 and 32, respectively, to clevis ends 33 and 34, on the output shaft 19 and the grinder disc assembly drive shaft 28, respectively.

As shown in FIG. 4, a bracket on the subframe SF fixes to an upperwardly extending bar 36 to which the piston rod 37 of the hydraulic cylinder 38 may be connected as with pin 39. The opposite end of the cylinder 38 is pinned as at 40 to a portion 41 of frame F. The pin 39 is insertable through one of a plurality of openings 36a in the bar 36 to vary the degree of permissible pivot of the subframe SF about pivot pins 24.

THE GRINDER DISC ASSEMBLY

As FIGS. 1–4 particularly indicate the grinder broadside disc assembly GA of the present invention includes a broadsidely oriented disc 42, which fixes to shaft 28, and which includes a front face 42a and a rear face 42b. Provided on the front face 42a of the disc 42, at 120° equi-angularly spaced intervals, are grinder tool bars 43, which releasably bolt to the disc as at 44. Mounted on the rear face 42b of the disc 42, are identical tool bars 45, which are releasably mounted on the disc 42 by bolts 46, and it will be seen that the bars 46 are also spaced at 120° intervals, equi-angularly between the tool bars 43. As will be noted, the tool bars 43 are provided with radially outer and inner edges 43a, which are relieved as at 43b. The radially outer and inner edges 45a of the tool bars 45 are relieved in the same angular direction, as at 45b. Rotation of the disc 42 in a clockwise direction in FIG. 2 causes the edges 43a to bite into the stump, and rotation of the disc 42 in the same direction on a return pass causes the edges 45a of the bars 45 to bite into the stump below the stump material removed by edges 43a, upon slight vertical adjustment of the return path of the tractor. A generally hemispheric shield, generally designated 47, fixes to the subframe members 25, as shown, in surrounding relation to the grinding disc assembly GA to deflect chips and debris and prevent them from flying outwardly radially. All of the grinding edges 43a, 45a are faced with carbide and, plainly, the tool bars can be released by removing bolts 44 and 46 and turned over end for end before being resecured to confront a stump with fresh edges.

The garden tractor depicted in FIG. 1 is a heavy duty Bolens garden tractor used for snowblowing and many other purposes. What has been added in the present instance by the inventor here is the grinder assembly GA which includes the arms 25, the grinder shaft supports, and the drive elements including the universal joint UJ. While other dimensions are possible, applicant prefers to use a disc which is 10 inches in diameter and dual-edged tool bars of 4 inches in length which extend an inch beyond the peripheral edge of the disc.

Typically, the tool bars 43 and 45 can be made of bar stock steel, an inch in width and a ½ inch in thickness, which are integral with the carbide edges 43a and 45a.

THE OPERATION

In operation, the foot pedal FP is operable to move the tractor forwardly as shown in FIGS. 1 to cut a swath S-1 of arcuate cross-section (see FIG. 5) about an inch in maximum depth, as the garden tractor moves from one side of the stump S to the other. To activate cylinder 38 to lower from a position raised above stump S to a swath removing position at one side of the stump, wherein the peripheral edge of disc 42 is just above the upper surface of the stump, lever 22 is manipulated. In proceeding forwardly, the revolving grinder assembly GA will remove a layer S-1 of about an inch in maximum depth as it moves forwardly across the upper surface of the stump S. When one horizontal layer is removed, the lever 22 is operative to pivot the subframe SF downwardly to move the grinder assembly downwardly about an inch. The tractor will then be reversely driven so that the toolbars 43, which project from the disc an inch also, take a second bite or swath S-2 during the reverse travel of the garden tractor. If the stump S is of such size as to make it necessary, the tractor path of movement will be slightly laterally adjusted by manipulating the steering wheel 16 and the next pass of the garden tractor forwardly will take a bite laterally adjacent to the bite just taken and a second bite on the return pass when the garden tractor moves rearwardly. While one inch of bite at the center of the swath taken is typical, the projection of the grinding tool bars can be altered to take more or less bite. Because the knives 43 and 45 are equi-angularly mounted, the disc 42, traveling at a rapid speed, is dynamically balanced.

The series of forward and reverse passes is repeated until the portion of the stump S above ground is wholly removed, and the tool bars can penetrate as much as five inches into the ground to fully reduce the stump S to the degree desired.

It is to be understood that other embodiments of the invention which accomplish the same function are incorporated herein within the scope of any ultimately allowed patent claims.

I claim:

1. In a tractor stump grinder including:
   a. a longitudinally extending tractor frame supported on ground engaging, motor driven, tractor propelling members;
   b. a drive motor supported on said frame and connected to operate said propelling members to move the tractor forwardly and rearwardly;
   c. a carrier subframe mounted for vertical movement on said tractor frame; and
   d. a drive connected with said subframe for moving it upwardly and downwardly on said tractor frame; the improvement wherein:
   e. a generally vertically disposed broadsidely oriented grinder disc, having a series of circumferentially spaced generally radial stump grinding tools mounted on and projecting peripherally from each vertical face of said grinder disc, is supported broadside to the frame for rotation in a plane generally transverse to said tractor frame on said carrier subframe, the tools having perimetral cutting edges extending generally longitudinally and crosswisely to said plane of rotation of the disc; and
   f. a drive mechanism is provided for rotating said grinder disc in a plane transverse to the longitudinal tractor frame as said tools remove a horizontal swath and then a subjacent horizontal swath in a pass across the upper end of a stump in both forward and rearward directions of movement of said tractor frame.

2. The stump grinder of claim 1 wherein said propelling members are wheels.

3. The stump grinder of claim 1 wherein said subframe comprises a longitudinally extending frame with said disc mounted on an end which overhangs the front end of said tractor frame, and said drive comprises a pressure fluid operated cylinder connected between said subframe and tractor frame.

4. The stump grinder of claim 1 wherein said drive mechanism includes a universally mounted drive shaft for said disc drivingly connected to said drive motor.

5. The stump grinder of claim 3 wherein said grinding tools on both disc faces are disposed in 120 degree spaced apart relation, with the tools on one face disposed equi-angularly between the tools on the other face.

6. The stump grinder of claim 5 wherein said tools have relieved interchangeable perimetral cutting edges on each end.

7. The stump of claim 5 wherein said tools on each side of the disc project substantially an equal distance radially beyond the disc.

8. In a method of grinding stumps having a trunk portion with an upper generally horizontal surface, utilizing a longitudinally extending tractor frame supported on ground engaging, motor-driven, tractor propelling members; a drive motor supported on the frame and connected to drive the propelling members selectively forwardly and rearwardly; a subframe mounted for vertical movement on the tractor frame and rotatably carrying a generally vertically disposed grinder disc assembly having opposed vertical disc faces extending broadside to the tractor frame; a drive connected with the subframe for moving it upwardly and downwardly on the tractor frame; a series of circumferentially spaced generally radial grinder tools projecting peripherally from each vertical face of the grinder disc; and a drive mechanism for rotating the disc in a transverse plane, comprising the steps of:

a. moving said subframe to vertically position the disc assembly broadside to the stump and below the level of said surface to define a generally horizontal swath to be cut across the stump and moving said tractor frame in a direction towards said stump in a pass to remove a swath across the upper face of said stump;

b. lowering said subframe and disc assembly to a position to define a second subjacent swath to be cut, and moving said tractor frame in the reverse direction towards said stump and across it in a path to remove a subjacent swath on the return pass.

9. The method defined in claim 8 wherein, for stumps which are wider than the diameter of said disc assembly, said steps are repeated at the sides of said swaths cut, as necessary.

10. The method defined in claim 8 wherein the tools on one face of said disc assembly remove the swath on one pass across the surface of the stump and the tools on the opposite face of the disc assembly remove the subjacent swath on the return pass of the grinder disc assembly.

11. A method of making a tractor stump grinder utilizing a longitudinally extending tractor frame supported on ground engaging, motor-driven, tractor-propelling members driven by a drive motor supported on the frame, and connected to operate the propelling members to move the tractor forwardly and rearwardly, the tractor frame mounting a carrier subframe for generally vertical movement on the tractor frame, comprising the steps of:

a. providing a grinder disc assembly having generally vertically disposed, opposite disc faces, extending transversely to the tractor frame, on the front end of the tractor frame in a frame overhanging position and mounting said disc assembly for rotation in a plane generally transverse to the tractor frame;

b. releasably mounting a series of circumferentially spaced generally radial grinding tools, having cutting edges extending generally longitudinally and crosswisely to said plane of rotation of the disc, on each vertical face of the grinder disc to project peripherally from the disc; and c. connecting a drive mechanism for rotating the grinder disc to remove a horizontal swath in a pass across the upper end of the stump in both forward and rearward directions of movement of the tractor frame.

12. The method of claim 11 comprising connecting a generally longitudinally extending universally mounted drive shaft between said disc and a drive motor takeoff on said tractor to drive the disc.

13. The method of claim 11 comprising mounting the tools on both faces of the grinder disc in 120 degree spaced relation, with the tools on one face disposed equi-angularly between the tools on the other face.

14. In a motor powered steerable vehicle such as a riding garden tractor having a control system operable to cause the motor to move the vehicle forwardly and rearwardly, the vehicle having a frame supported by wheels and mounting a motor having a power takeoff near its front end, the improvement wherein:

a. a forwardly extending rotary shaft connected with said power takeoff is journaled on the frame to project forwardly of the front end thereof;

b. a vertically movable transversely extending disc having a front and rear face is mounted on the front end of the shaft broadside to the frame; and c. a series of circumferentially spaced generally radially disposed grinding tools are fixed on both the front and rear faces of the disc to project radially therefrom and have edges disposed beyond the perimeter of the disc to remove a first swath across the top of the stump when the vehicle is moving forwardly and a second subjacent swath when the vehicle is returned rearwardly.

15. The invention of claim 14 wherein the tools on the rear face of the disc lie radially intermediate the tools on the front face of the disc.

16. The invention of claim 15 wherein the tools on each face of the disc are 120 degrees apart.

17. The invention of claim 14 wherein said shaft is universally connected to said takeoff.

18. The stump grinder of claim 14 wherein said frame incorporates a fore to aft extending swingable member pivotally hung from said frame to swing its front end vertically; said disc shaft being mounted in overhanging position on the front end of said member; and a hydraulic cylinder extending between said frame and member to move said disc shaft and disc vertically.

* * * * *